US007129436B1

(12) United States Patent
Corne

(10) Patent No.: US 7,129,436 B1
(45) Date of Patent: Oct. 31, 2006

(54) LAMINAR-VORTEX WELDING CHAMBER

(75) Inventor: Joseph E. Corne, 27095 Via Callado, Mission Viejo, CA (US) 92691

(73) Assignee: Joseph E. Corne, Mission Viejo, CA (US)

( * ) Notice: Subject to any disclaimer, the term of this patent is extended or adjusted under 35 U.S.C. 154(b) by 0 days.

(21) Appl. No.: 11/220,032

(22) Filed: Sep. 6, 2005

(51) Int. Cl.
*B23K 9/32* (2006.01)

(52) U.S. Cl. .................................................. 219/72

(58) Field of Classification Search ............... 219/522, 219/537, 72; 312/1
See application file for complete search history.

(56) References Cited

U.S. PATENT DOCUMENTS

| | | | | |
|---|---|---|---|---|
| 2,580,317 A | * | 12/1951 | Pekar et al. | 55/426 |
| 2,786,740 A | * | 3/1957 | Taylor et al. | 312/1 |
| 3,005,673 A | * | 10/1961 | Smith et al. | 312/1 |
| 4,277,131 A | * | 7/1981 | Hart et al. | 359/509 |
| 4,443,072 A | * | 4/1984 | Ballard | 359/509 |
| 4,570,551 A | * | 2/1986 | Derbidge et al. | 110/263 |
| 4,927,438 A | * | 5/1990 | Mears et al. | 55/385.2 |
| 5,685,771 A | * | 11/1997 | Kleppen | 454/56 |

* cited by examiner

*Primary Examiner*—Kevin P. Kerns

(57) ABSTRACT

A welding chamber having a laminar-vortex inert gas flow is disclosed. The welding chamber comprises a transparent dome that covers an open top side of a rigid generally rectanguloid enclosure. The dome includes a one-way vent for discharging ambient air from within the chamber while preventing the introduction of ambient air into the chamber. The enclosure includes a bottom and side walls that are joined at smooth, curved edges, and at least one side wall of the enclosure includes portholes with gloves for manually accessing the interior of the chamber while the dome is in a closed position. At least one gas distribution tube, a plurality of gas inlets and laminar-flow tunnels are included. In use, an inert gas is introduced into the distribution tube that substantially encircles the top of the enclosure. The inert gas is directed downward through the laminar flow tunnels, attached to the side walls of the enclosure, where the gas exits each tunnel with a laminar flow and is directed by the radiused bottom corners of the enclosure from a vertical flow to a horizontal flow across the bottom of the enclosure. As such, the inert gas creates a slow-moving counter-clockwise vortex pattern. In this manner, heavier-than-air argon gas fills the enclosure, displacing ambient air within the chamber, which is forced to rise and exit the chamber through a check valve vent in the top of the dome.

5 Claims, 3 Drawing Sheets

LAMINAR-VORTEX WELDING CHAMBER

FIELD OF THE INVENTION

This invention relates to inert-gas-filled chambers, specially to chambers used to weld titanium and other refractory materials.

BACKGROUND OF INVENTION

Many exotic metals, such as titanium, cannot be welded in the presence of air without producing a weak and discolored weld. An inert gas such as argon or helium may be used to displace the air surrounding the weld, thereby solving the problem. A popular solution is to place the workpieces to be welded into a welding chamber that has been designed to purge the air and replace it with inert gas.

There are currently on the market several types of welding chambers suitable for welding exotic metals in an inert-gas atmosphere. Each provides access to workpieces and a welding torch with plastic gloves through portholes in the side of the chamber. Each has a system for introducing the inert gas to the interior of the chamber. Each provides a vent in the chamber to expel air.

A "beach-ball" type of welding chamber is made from flexible clear-plastic pieces fastened together in the shape of a flat-bottomed beach ball. U.S. Pat. No. 5,685,771 to Kleppen on Nov. 11, 1997 is an example of such a device. This type of device is usually mounted to a round work table. Workpieces to be welded may be inserted and removed through a zipper in the plastic. A major problem with the beach-ball type of chamber is its susceptibility to damage from a hot torch, from weld spatter, or from sharp-edged workpieces, any of which may cause holes that allow the escape of inert gas or the entry of air. Costly downtime is the result until the damaged area is patched. Secondly, rips in the plastic may occur in the creases caused by repeated inflations and deflations. Thirdly, pockets of air residing the in the folds of such a chamber when deflated can mix with incoming inert gas, increasing the time required to fully purge such a chamber. Lastly, it is difficult to clean such a soft plastic chamber without it becoming scratched, which impedes viewing therethrough during subsequent operation by a user.

A "glove-box" or "sand-blaster" type of chamber is a steel box with gloved portholes in front and a clear plastic viewing window above the portholes. Workpieces are inserted and removed through a door in the top or side of the box. One problem with this type of device is its limited visibility through what is typically a small window. Secondly, if the door is located on the top of the chamber, it is difficult to add or remove workpieces, if the door is on the side of the chamber, inert gas is lost when the chamber is opened. Thirdly, the inside square edges and corners can trap pockets of air, increasing purge time and making cleaning relatively difficult.

A "bell-jar" type of chamber consists of a rigid plastic dome resting on a heavy steel table. A substantial counterweight arrangement is necessary to help left the heavy dome. Porthole gloves are mounted through the plastic dome. This 50-year-old design is attributed to the aerospace industry in the early years of titanium welding and has little or no prior art. Workpieces are placed on or removed from the table by lifting the dome, resulting in a complete loss of gas. Although an optional access chamber may be built into the side of the dome to allow small workpieces to be inserted or removed from the chamber without lifting the dome, such as access chamber requires a separate purge system from the main bell-jar chamber. Often called the "Cadillac" of welding chambers, this type of device has several drawbacks. First is the expense, as many companies find such a device cost-prohibitive. Secondly is the often impractical weight of such a device. A forklift truck is typically necessary to move such a device. Thirdly, the right-angle juncture of the dome and the table leaves pockets of air. The device uses a diffuser to slow the entry of gas to prevent any turbulence, thereby inhibiting any scrubbing action of residual pockets of air within the device, resulting in longer purge times.

Accordingly, there is a need for an affordable welding chamber that allows for unfettered access to 100% of the chamber while still minimizing the escape of heavier-than-air gas from the chamber when a workpiece is removed or introduced to the chamber. Such a needed device would thereby conserve the inert gas that fills the chamber during welding operations. Further, such a needed device would provide a full 100% visibility of the inside of the chamber when a user is operating the device, such as through use of a pair of glove ports. Such a needed device would facilitate electrical grounding of any metal workpieces for arc welding thereof. Still further, such a needed device would be relatively light weight, easy and compact to store, easy to clean and free from any sharp projections or corners either inside the chamber or on the exterior surface thereof. Still further, the gas inside the chamber of such a needed device could be quickly purge if desired, minimizing turn-around time between welding sessions requiring a different gas inside the chamber. The present invention accomplishes these objectives. Further objects and advantages will become apparent from a consideration of the ensuing description and drawings.

SUMMARY OF THE INVENTION

The present invention is a rigid-bodied welding chamber comprising a transparent dome that covers an open top-side of a rigid generally rectanguloid enclosure. One edge of the dome is hinged to one side of the enclosure such that the dome may assume either an open position, providing access to the interior of the enclosure, or a closed position, thereby achieving a substantially air-tight seal between the dome and the enclosure. The dome includes a one-way vent for discharging ambient air from within the chamber while preventing the introduction of ambient air into the chamber.

The enclosure includes a bottom and side walls. The bottom and sidewalls are joined at smooth, curved edges. The bottom is preferably made from a conductive metal, such as aluminum, and serves as a solid working surface for workpieces and may also serve as an electrical ground for the workpieces during welding operations. At least one side wall of the enclosure includes portholes with gloves for manually accessing the interior of the chamber while the dome is in the closed position.

Laminar-Vortex purge assemblies are included that comprise at least one gas distribution tube, a plurality of gas inlets and laminar-flow tunnels. In use, the Laminar-Vortex purge process begins with inert gas, such as argon, being introduced into the distribution tube substantially encircling the top of the enclosure. The inert gas enters the chamber through the gas inlets, one each located at the left side of each of the four walls when looking at each wall from inside the enclosure. The inert gas is directed downward through the laminar flow tunnels, attached to the inside walls of the enclosure, where the gas exits each tunnel with a laminar flow and is directed by the radiused bottom corners of the enclosure from a vertical flow to a horizontal flow across the bottom of the enclosure. As such, the inert gas creates a slow-moving counter-clockwise rising vortex pattern. In this manner, heavier-than-air argon gas fills the enclosure, displacing ambient air within the chamber, which is forced to rise and exit the chamber through a check valve vent in the top of the dome. Further, the vortex movement of inert gas serves to "scrub" the chamber of residual pockets of air.

In accordance with the invention, the welding chamber is a rigid bodied device that provides an inert gas atmosphere for welding titanium and other refractory metals. The present device allows for relatively unfettered access to all areas of the chamber while still minimizing the escape of heavier-than-air gas from the chamber when a workpiece is removed or introduced to the chamber. As such the present invention conserves the inert gas that fills the chamber during welding operations, in the case of a heaver-than-air inert gas being used. Further, the present invention provides full visibility inside the chamber when a user is operating the device, and facilitates electrical grounding of any metal workpieces. Still further, the present invention is relatively light weight, easy and compact to store such as by flipping the dome upside down into the enclosure for storage, and is easy to clean and free from any sharp projections or corners either inside the chamber or on the exterior surface thereof. Still further, gas within the chamber of the present invention may be quickly purged if desired, minimizing turn-around time between welding sessions requiring a different gas inside the chamber. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
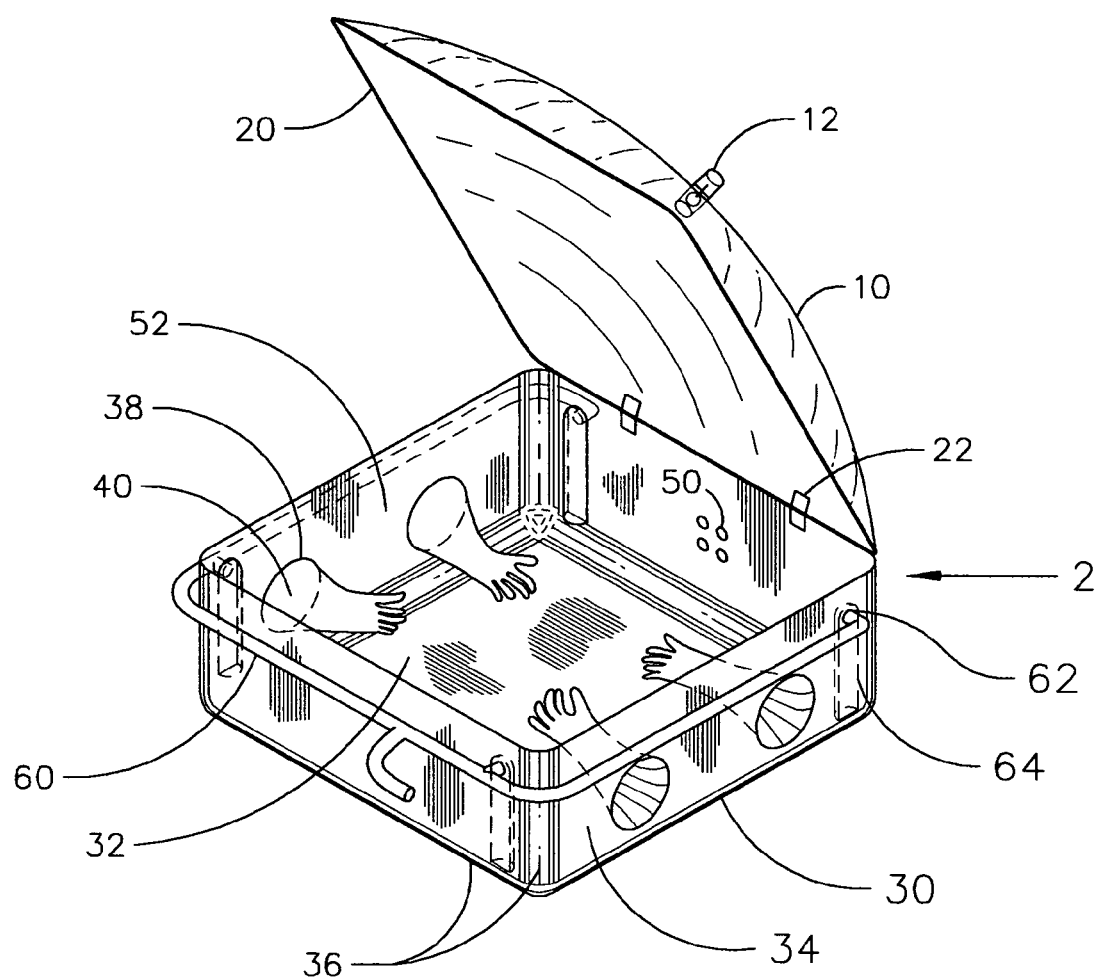
FIG. 1 is a perspective illustration of the invention, illustrating a welding chamber with a dome in an upright position.
Figure 2:
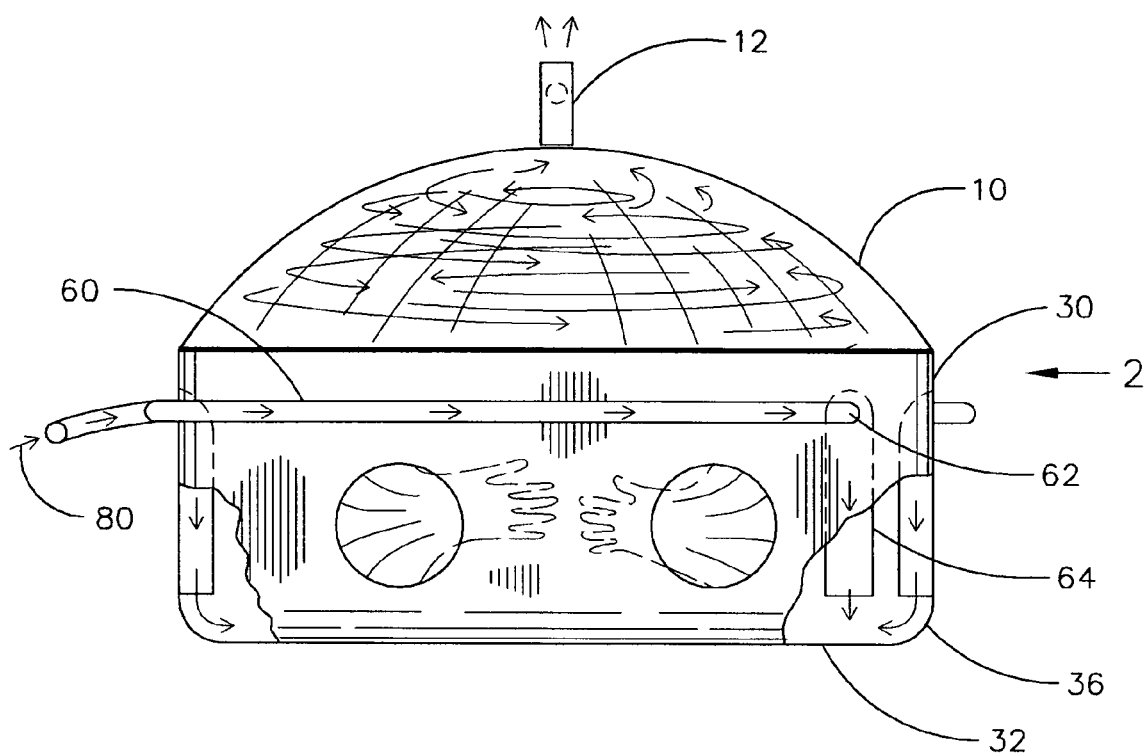
FIG. 2 is a front elevational view, partially broken away, illustrating the dome of the invention in a closed position and an upward rise of gas within the chamber thereof.
Figure 3:
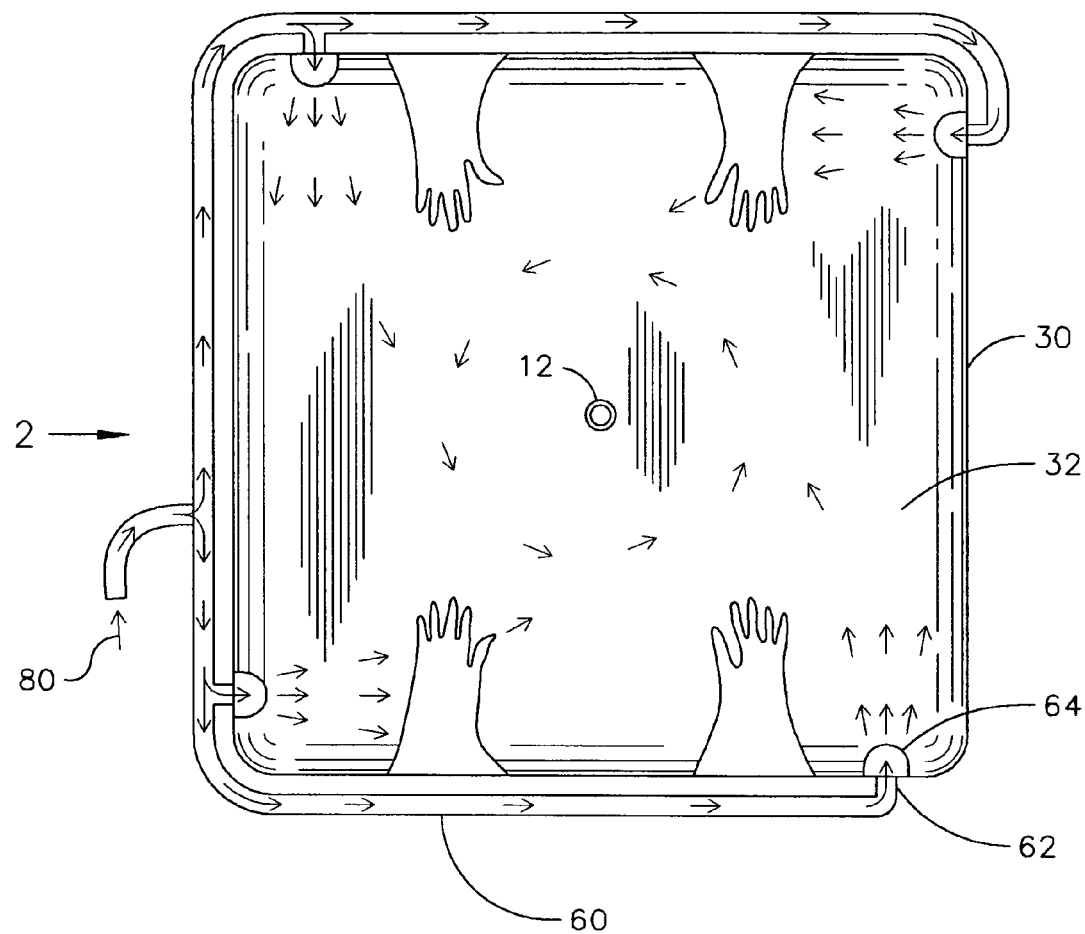
FIG. 3 is a top plan view of the invention, illustrating a laminar and vortex flow of gas through the chamber thereof.

The present invention is a rigid-bodied welding chamber 2 (FIG. 1), comprising a transparent dome 10 that covers a rigid enclosure 30. FIG. 1 illustrates the chamber 2 in an open position, while FIGS. 2 and 3 illustrate the chamber in an air-tight closed position. Preferably the dome 10 is constructed of a high-strength acrylic, polycarbonate or other suitable strong yet substantially transparent material. The enclosure 30 is preferably made from a rigid sheet metal or other strong, durable material. A pair of hinges 22 is used to pivotably mount the dome 10 to the enclosure 30 at one edge of thereof A resilient gasket 20 (FIGS. 1 and 2) provides an air-tight seal between the enclosure 30 and the dome 10 when the dome 10 is in the closed position. The gasket 20 is preferably attached to an edge of the dome 10 and is thereby lifted up and out of the way when the dome 10 is in its open position. While the gasket 20 can also easily be attached around an open edge of the enclosure 30, such positioning would increase the chances of the gasket 20 being snagged or otherwise damaged when introducing or removing workpieces (not shown) into the enclosure 30 and is therefore not the preferred mode of the invention.

The dome 10 includes a vent 12 for discharging ambient air from within the chamber 2 while preventing the introduction of ambient air into the chamber 2. The vent 12 is preferably a simple ball check valve as shown in FIGS. 1 and 2. Clearly, however, other types of one-way air valves could readily be used as the vent 12.

The enclosure 30 includes a bottom 32 and side walls 34. The bottom 32 and sidewalls 34 are joined at smooth, radiused edges 36. The bottom 32 is preferably made from a conductive metal, such as aluminum. The bottom 32 serves as a solid working surface for workpieces (not shown) and may serve as an electrical ground for the workpieces during welding operations. At least one side wall 34 of the enclosure 30 includes portholes 38 with gloves 40 for manually accessing the interior of the chamber 2 while the dome 10 is in the closed position. The gloves 40 enable a person to handle a torch (not shown) and welding rods (not shown) necessary to weld workpieces together.

The inside surface 52 of the side walls 34 of the enclosure 30 are preferably coated with a flat-black finish to minimize reflection of intense light rays that can be produced from welding operations. Access holes 50 for equipment fittings (not shown) are provided in at least one side wall 34 for entry of torch power, gas, cooling water, and for power cords as needed.

Laminar-Vortex purge assemblies are included (FIGS. 2 and 3) that comprise at least one gas distribution tube 60, a plurality of gas inlets 62 and laminar-flow tunnels 64. In use, the Laminar-Vortex purge process begins with inert gas 80, such as argon, being introduced into the distribution tube 60 substantially encircling the top of the enclosure 30 (FIGS. 2 and 3). The inert gas 80 enters the chamber 2 through the gas inlets 62, one each located at the left side of each of the four walls 34 when looking at the walls 34 from inside the enclosure 30. The inert gas 80 is directed downward through the laminar-flow tunnels 64 attached to the side walls 34 of the enclosure 30 with a suitable attachment means (not shown), such as screws or adhesive. The inert gas 80 exits each tunnel 64 with a laminar flow and is directed by the radiused bottom corners 36 of the enclosure 30 from a vertical flow to a horizontal flow across the bottom 32 of the enclosure 30. The inert gas 80, still retaining a laminar flow, but somewhat spread out at this point, flows in four separate streams across the bottom 32 of the enclosure 30 and converges on the bottom 32 of the chamber 2 creating a slow-moving rising circular, or vortex, pattern (FIG. 3). In this manner, heavier-than-air argon gas 80 fills the enclosure 30, displacing and forcing ambient air to rise within the chamber 2, and exit the chamber 2 through a check valve vent 12 in the top of the dome 10.

While a particular form of the invention has been illustrated and described, it will be apparent that various modifications can be made without departing from the spirit and scope of the invention. For example, the exact materials used in the construction of the enclosure 30 may be modified extensively without changing the nature or scope of the invention. Further, the shape of the chamber could be circular or oblong in plan view as well as rectangular (as illustrated). Further, the means of producing the laminar-vortex flow of inert gas 80 may be modified, and still achieve the objectives of the present invention. Accordingly, it is not intended that the invention be limited, except as by the appended claims.

I claim:

1. A welding chamber comprising;

a substantially rectanguloid enclosure having an open top side, four side walls, and a bottom side, each side wall of the enclosure being radiused at its bottom edge with the bottom side of the enclosure;

a substantially dome-shaped transparent cover attached at one edge thereof with hinge means on one side wall proximate to a top edge of the enclosure, such cover being positionable in either a closed position covering the open top side of the enclosure or an open position allowing access inside the enclosure through the open top side thereof;

a plurality of gas inlets, each gas inlet traversing through one side wall, a laminar-flow tunnel fixed to an inside surface of each side wall, one end of each flow tunnel being set over one of the plurality of gas inlets, and the other end of each flow tunnel being open-ended and directed toward the bottom of the enclosure, each laminar-flow tunnel for directing the gas downward within the chamber and for providing an expanded volume in which the gas streams emitted by each gas inlet may become even-flowing and non-turbulent;

such that when gas is introduced into the gas inlets, a gas stream is emitted from each of the gas inlets into the welding chamber to cause a vortex pattern of gas flow inside the enclosure, laminar gas flow streams going from a vertical downward direction to a horizontal direction across the bottom side of the enclosure, each gas stream being generally tangential to the vortex pattern.

2. The welding chamber of claim 1 wherein the shape of the enclosure in plan view is circular or oblong, the chamber including the open top side, a continuous curved side wall and the bottom side.

3. The welding chamber of claim 1 further including a distribution pipe for fluidly interconnecting the plurality of gas inlets to a single gas source.

4. The welding chamber of claim 1 further including a gasket means attached to an edge of the dome cover for providing a substantially air-tight seal with the top edge of the enclosure when the dome is in the closed position.

5. The welding chamber of claim 1 wherein the dome further includes a one-way gas vent at a top portion thereof for venting gas from inside the welding chamber.

* * * * *